United States Patent
Su

(10) Patent No.: US 9,611,394 B2
(45) Date of Patent: Apr. 4, 2017

(54) FLOOR BOARD

(71) Applicant: Cheng-Yi Su, Douliu (TW)

(72) Inventor: Cheng-Yi Su, Douliu (TW)

( * ) Notice: Subject to any disclaimer, the term of this patent is extended or adjusted under 35 U.S.C. 154(b) by 0 days.

(21) Appl. No.: 15/150,956

(22) Filed: May 10, 2016

(65) Prior Publication Data

US 2016/0340513 A1    Nov. 24, 2016

(30) Foreign Application Priority Data

May 19, 2015 (TW) .............................. 104207710 U

(51) Int. Cl.
*C09D 5/00* (2006.01)
*E04F 15/02* (2006.01)
*E04F 15/10* (2006.01)

(52) U.S. Cl.
CPC .......... *C09D 5/00* (2013.01); *E04F 15/02038* (2013.01); *E04F 15/10* (2013.01); *E04F 15/107* (2013.01); *E04F 2201/0153* (2013.01); *E04F 2201/044* (2013.01)

(58) Field of Classification Search
CPC .......... C09D 5/00; E04F 15/10; E04F 15/107; E04F 15/02038; A61K 41/00
See application file for complete search history.

(56) References Cited

U.S. PATENT DOCUMENTS

| 2,093,870 A | * | 9/1937 | Lang | ...................... E04G 23/02 106/230 |
| 2006/0037270 A1 | * | 2/2006 | Niese | ...................... E04F 15/04 52/578 |
| 2014/0367477 A1 | * | 12/2014 | Cha | ...................... F24D 3/146 237/69 |

FOREIGN PATENT DOCUMENTS

| CN | 200999446 Y | * | 1/2008 | |
| CN | 203174977 U | * | 9/2013 | |
| GB | 2064989 A | * | 6/1981 | .............. E04C 2/16 |
| WO | WO 03078750 A1 | * | 9/2003 | ............ B32B 21/00 |

* cited by examiner

*Primary Examiner* — Jeanette E Chapman
(74) *Attorney, Agent, or Firm* — Trop Pruner & Hu, P.C.

(57) ABSTRACT

A floor board includes a board unit that includes a substrate and a coating unit. The substrate has a first side surface, a second side surface opposite to the first side surface, a male engaging part extending outwardly from the first side surface, and a female engaging part indented inwardly from the second side surface. The male engaging part corresponds in shape to the female engaging part. The coating unit is formed on the first and second side surfaces, and the male and female engaging parts, and includes a far-infrared radiating material.

11 Claims, 5 Drawing Sheets

FLOOR BOARD

CROSS-REFERENCE TO RELATED APPLICATION

This application claims priority of Taiwanese Utility Model Patent Application No. 104207710, filed on May 19, 2015.

FIELD

The disclosure relates to a floor board, and more particularly to a floor board including a far-infrared radiating material.

BACKGROUND

In the spectral composition of sunlight, far-infrared radiation is low energy radiation that is capable of penetrating into the hypodermic layer of human skin. The vibration frequency of the far-infrared radiation is similar to that of human cells. As a result, the far-infrared radiation is capable of increasing cellular metabolism and blood circulation, and therefore is beneficial to eliminating waste from the body. Currently, mineral particles capable of emitting far-infrared, such as aluminum oxide, zirconium dioxide, titanium dioxide, yttrium oxide, and combinations thereof, are incorporated into application materials. By using special processing techniques, the application materials are increased in value and made into various items used in daily life.

Referring to FIG. 1, a conventional floor board 10 includes two board units 1, each of which includes a substrate 11 and a wear resistant layer 12. The substrate 11 of each of the board units 1 has a first side surface 112, a second side surface 113 opposite to the first side surface 112, a top surface 111 interconnecting the first and second side surfaces 112, 113, a male engaging part 114 extending outwardly from the first side surface 112, and a female engaging part 115 indented inwardly from the second side surface 113. The male engaging part 114 corresponds in shape to the female engaging part 115. The male engaging part 114 of the substrate 11 of one of the board units 1 engages with the female engaging part 115 of the substrate 11 of the other one of the board units 1. The wear resistant layer 12 of each of the board units 1 is disposed on the top surface 111 of the substrate 11 of the board unit 1, and has a plurality of micro grooves 121 to form a plurality of wood grain patterns 122.

When a paste (not shown) including a far-infrared material is applied onto the wear resistant layer 12 of each of the board units 1, the paste may fill the micro grooves 121 of the wear resistant layer 12 and damage the wood grain patterns 122.

Referring to FIG. 2, the friction between the male engaging part 114 and the corresponding female engaging part 115 may cause the engagement process to be unsmooth, and may even fracture the corresponding board unit 1 to form a plurality of cracks 2.

SUMMARY

Therefore, an object of the present disclosure is to provide a floor board that can alleviate at least one of the drawbacks associated with the prior art.

According to the present disclosure, a floor board includes a board unit including a substrate and a coating layer. The substrate has a first side surface, a second side surface opposite to the first side surface, a male engaging part extending outwardly from the first side surface, and a female engaging part indented inwardly from the second side surface. The male engaging part corresponds in shape to the female engaging part. The coating layer is formed on the first and second side surfaces, and the male and female engaging parts, and includes a far-infrared radiating material.

BRIEF DESCRIPTION OF THE DRAWINGS

Other features and advantages of the present disclosure will become apparent in the following detailed description of the embodiment with reference to the accompanying drawing, of which.

DETAILED DESCRIPTION

Figure 1:
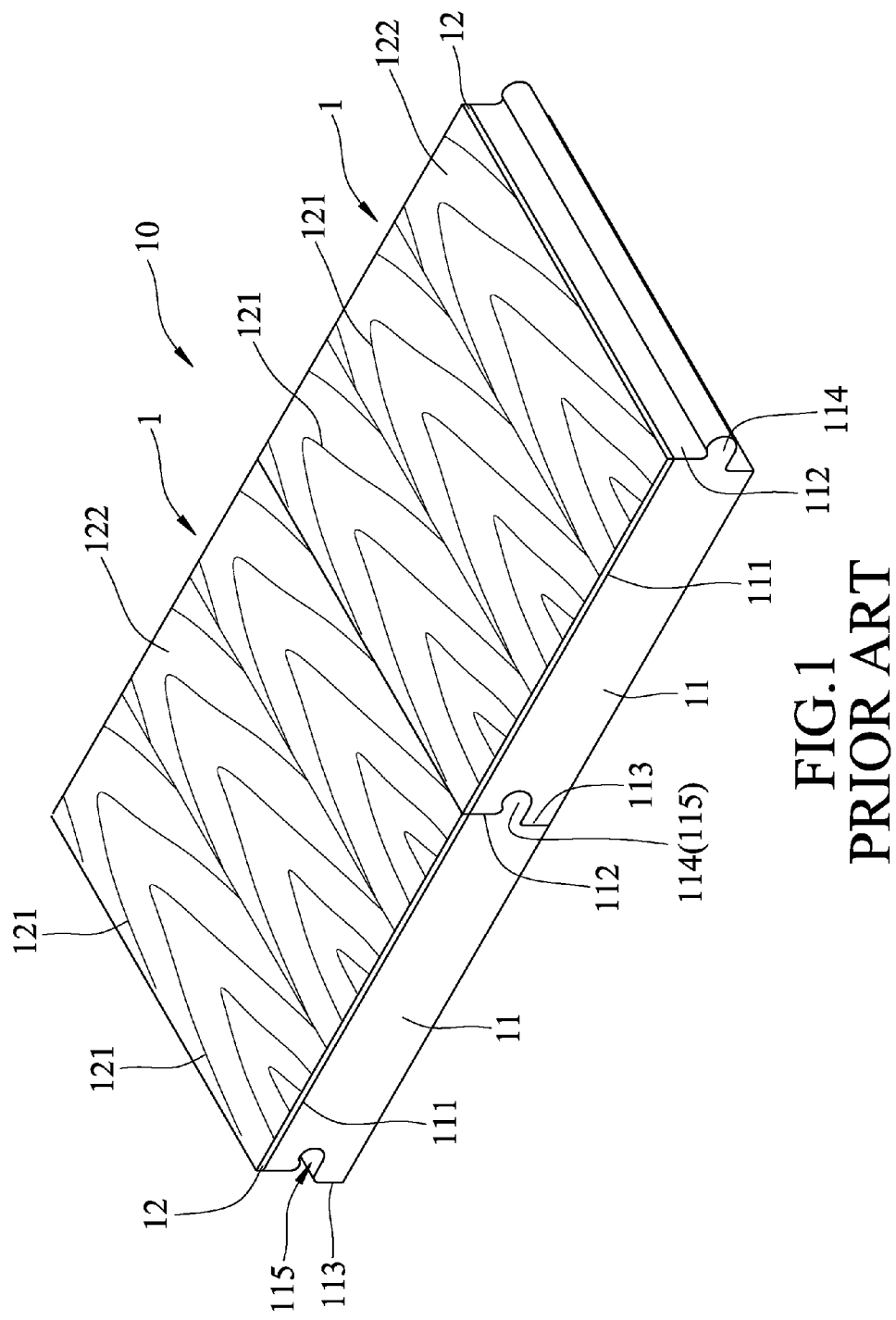
FIG. 1 is a perspective view of a conventional floor board.
Figure 2:
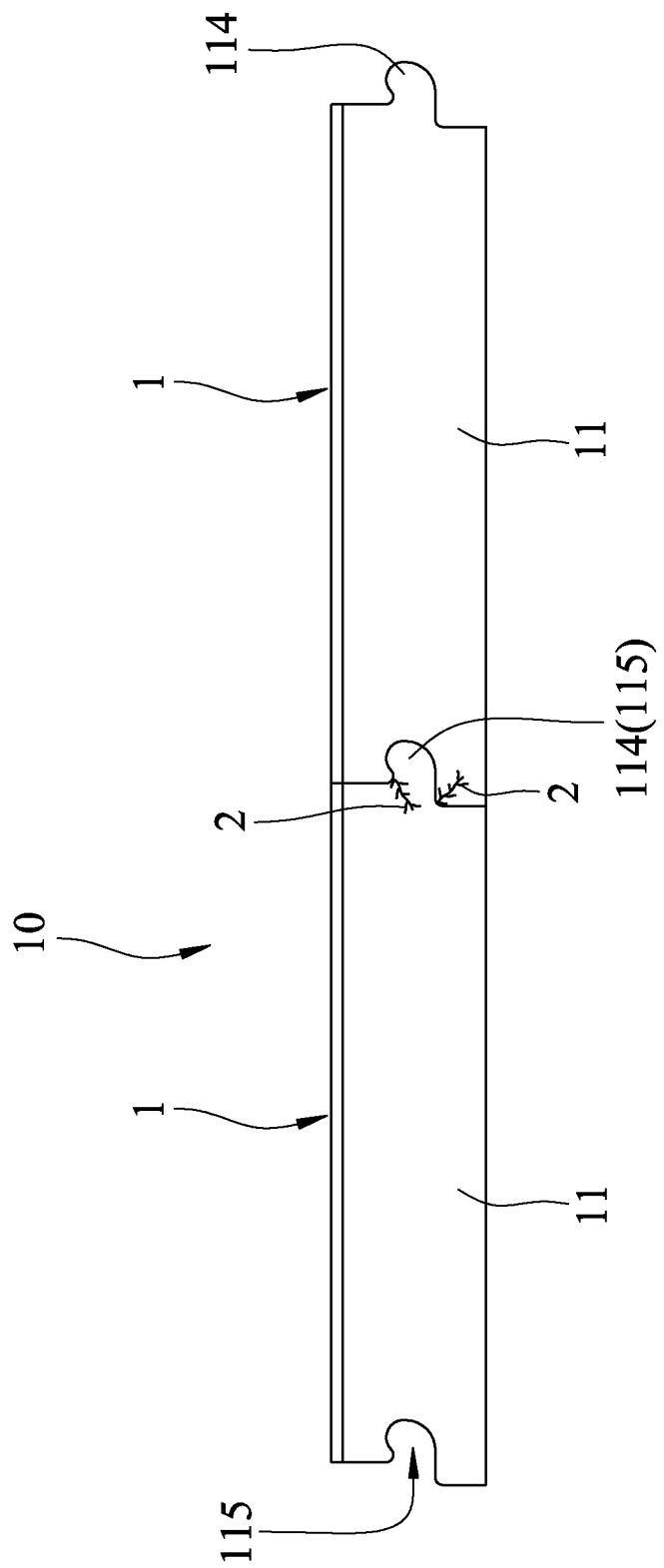
FIG. 2 is a side view of the conventional floor board.
Figure 3:
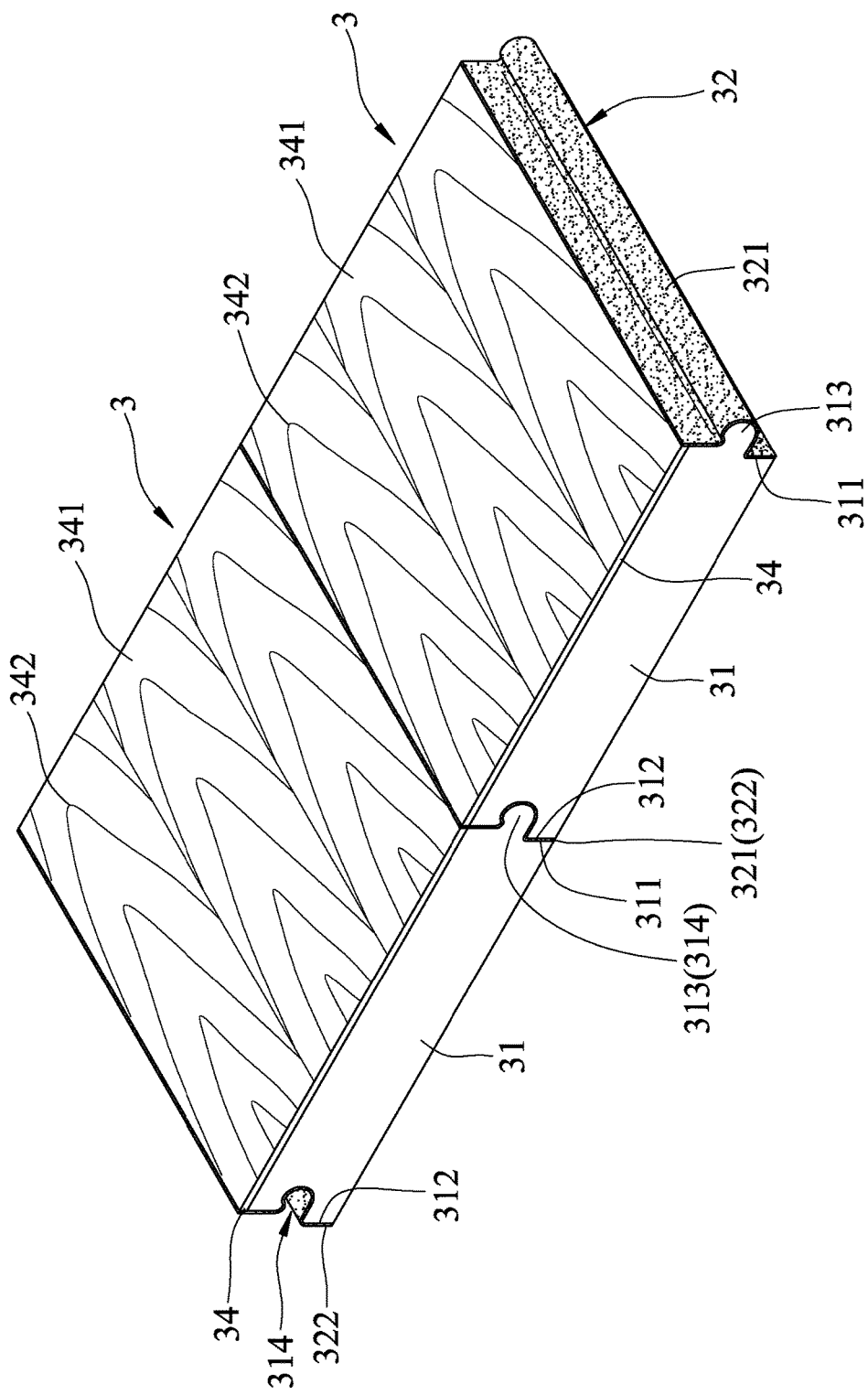
FIG. 3 is a perspective view of an embodiment of a floor board of this disclosure.

Referring to FIG. 3, an embodiment of a floor board according to the present disclosure includes two board units 3, each of which includes a substrate 31, a coating unit 32 and a wear resistant layer 34.

The structures of the board units 3 are identical to each other, and therefore only one of the board units 3 is described in this paragraph for the sake of brevity. The substrate 31 has a first side surface 311, a second side surface 312 opposite to the first side surface 311, a top surface 315 interconnecting the first and second side surfaces 311, 312, a male engaging part 313 extending outwardly from the first side surface 311, and a female engaging part 314 indented inwardly from the second side surface 312. The male engaging part 313 corresponds shape to the female engaging part 314. In this embodiment, the male engaging part 313 is a protrusion, and the female engaging part 314 is a groove. The coating unit 32 has a first coating layer 321 that is formed on the first side surface 311 and the male engaging part 313, and a second coating layer 322 that is formed on the second side surface 312 and the female engaging part 314. The wear resistant layer 34 is disposed on the top surface 315 of the substrate 31, and has an upper surface 341 opposite to the substrate 31 and a wood grain pattern 342 formed on the upper surface 341.

The substrate 31 of each of the board units 3 may be made of a wood material. Alternatively, the substrate 31 of each of the board units 3 may be made of a composite material.

Each of the first coating layer 321 and the second coating layer 322 of the coating unit 32 of each of the board units 3 includes a far-infrared radiating material that may be made of a material selected from zinc oxide, aluminum oxide, magnesium oxide, titanium dioxide, silicon dioxide, and combinations thereof. Alternatively, each of the first coating layer 321 and the second coating layer 322 of the coating unit 32 of each of the board units 3 may further include a wax, a lacquer material, a lubricant, or combinations thereof.

The wear resistant layer 34 of each of the board units 3 may be made of a plastic material, such as an ultrahigh molecular weight polyethylene (UHMWPE). It should be particularly pointed out that the coating unit 32 of each of the board units 3 is not coated onto the upper surface 341 of the wear resistant layer 34 of the corresponding board unit 3. Therefore, the wood grain pattern 342 of the wear resistant layer 34 of each of the board units is not affected by the coating unit 32 of the corresponding board unit 3.

Figure 4:
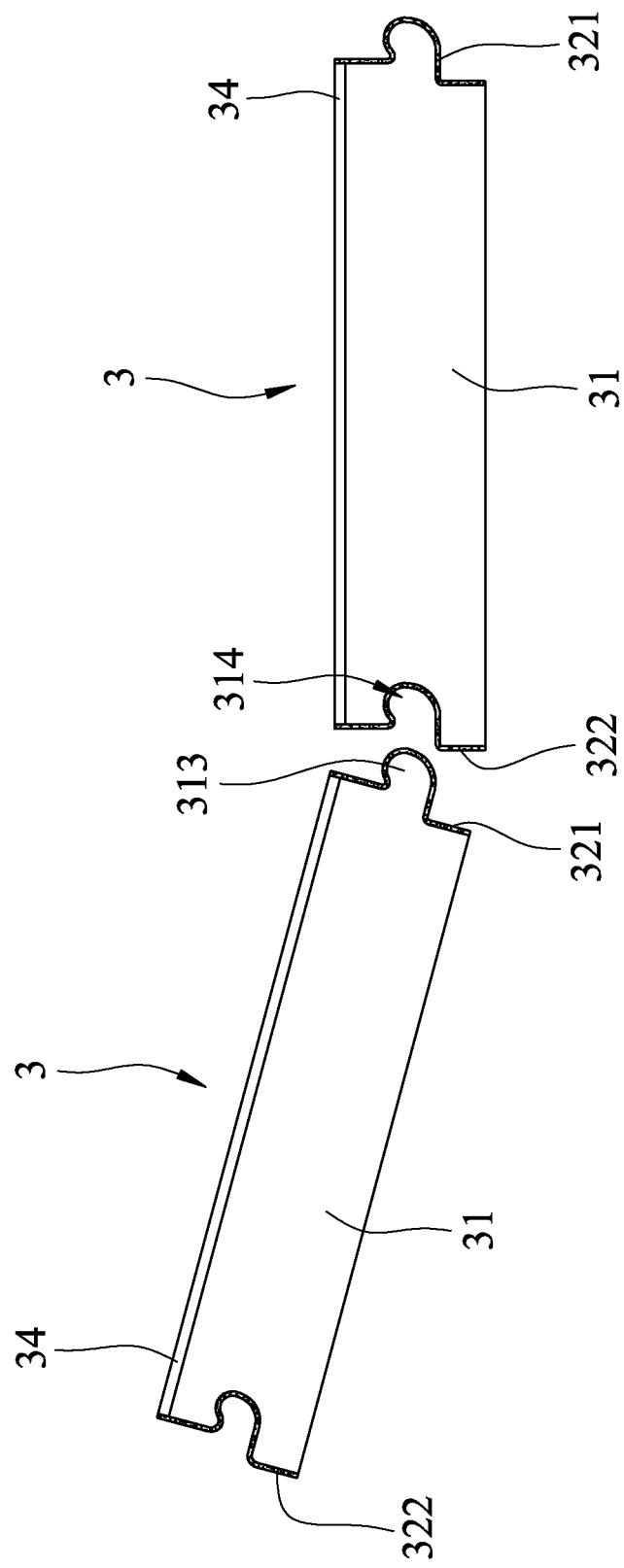
FIG. 4 is a schematic view illustrating an assembly process of the embodiment.
Figure 5:
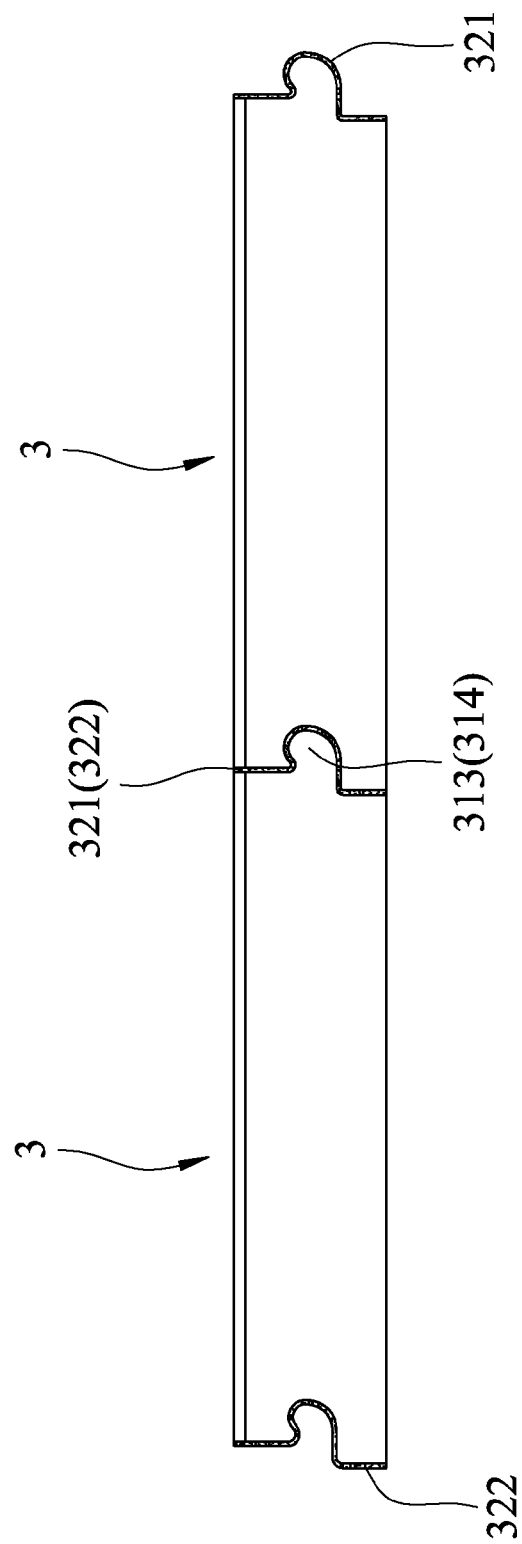
FIG. 5 is a side view of the embodiment.

Referring to FIGS. 4 and 5, during assembly of the floor board, the female engaging part 314 of the substrate 31 of one of the board units 3 is brought into engagement with the male engaging part 313 of the substrate 31 of another one of the board units 3, such that the female engaging part 314 fittingly engages the male engaging part 313. The coating units 32 of the board units 3 provide a lubricating effect for such engagement, thereby alleviating the unsmooth engagement and fracture associated with the conventional floor board 10. Moreover, after assembly, the coating unit 32 of each of the board units 3 may serve as a buffer layer that prevents damage to the board units 3 caused by an external force, such as a squeezing force.

The merits of this disclosure are summarized below.

In each of the board units 3, the first coating layer 321 of the coating unit 32 is formed on the first side surface 311 and the male engaging part 313, and the second coating layer 322 of the coating unit 32 is formed on the second side surface 312 and the female engaging part 314. Both the first coating layer 321 and the second coating layer 322 are not coated onto the upper surface 341 of the wear resistant layer 34, and therefore would not affect the wood grain pattern 342 of the wear resistant layer 34.

The coating units 32 of the board units 3 provide a lubricating effect for engagement between the female engaging part 314 of the substrate 31 of one of the board units 3 and the male engaging part 313 of the substrate 31 of another one of the board units 3, thereby reducing the possibility of damaging the board units 3 during assembly.

The far-infrared radiating material included in each of the first coating layer 321 and the second coating layer 322 of the coating unit 32 of each of the board units 3 is capable of emitting far-infrared radiation through the interface between the board units 3. The far infrared radiation is capable of enhancing the human immune system and eliminating hazardous objects in the environment.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A floor board comprising a board unit including a substrate and a coating unit, said substrate having a first side surface, a second side surface opposite to said first side surface, a male engaging part extending outwardly from said first side surface, and a female engaging part indented inwardly from said second side surface, said male engaging part corresponding in shape to said female engaging part, said coating unit being formed on said first and second side surfaces, and said male and female engaging parts, and including a far-infrared radiating material.

2. The floor board of claim 1, wherein said floor board comprises two of said board units, said female engaging part of said substrate of one of said board units fittingly engaging said male engaging part of said substrate of the other one of said board units.

3. The floor board of claim 1, wherein said male engaging part is a protrusion, and said female engaging part is a groove.

4. The floor board of claim 1, wherein said coating unit further includes a wax.

5. The floor board of claim 1, wherein said coating unit further includes a lacquer material.

6. The floor board of claim 1, wherein said coating unit further includes a lubricant.

7. The floor board of claim 1, wherein said substrate further has a top surface interconnecting said first and second side surfaces, said board unit further including a wear resistant layer disposed on said top surface of said substrate.

8. The floor board of claim 1, wherein said substrate is made of a wood material.

9. The floor board of claim 1, wherein said substrate is made of a composite material.

10. The floor board of claim 7, wherein said wear resistant layer is made of a plastic material.

11. The floor board of claim 7, wherein said wear resistant layer has an upper surface opposite to said substrate, and a wood grain pattern formed on said upper surface.

* * * * *